(12) United States Patent
Hickman

(10) Patent No.: US 9,151,323 B2
(45) Date of Patent: Oct. 6, 2015

(54) TONG BEARING

(71) Applicant: Don Darrell Hickman, Williston, ND (US)

(72) Inventor: Don Darrell Hickman, Williston, ND (US)

( * ) Notice: Subject to any disclaimer, the term of this patent is extended or adjusted under 35 U.S.C. 154(b) by 0 days.

(21) Appl. No.: 14/055,668

(22) Filed: Oct. 16, 2013

(65) Prior Publication Data

US 2014/0105526 A1    Apr. 17, 2014

Related U.S. Application Data

(60) Provisional application No. 61/714,632, filed on Oct. 16, 2012.

(51) Int. Cl.
*F16C 17/12* (2006.01)
*B23P 6/00* (2006.01)
*F16C 43/02* (2006.01)
*E21B 19/16* (2006.01)

(52) U.S. Cl.
CPC . *F16C 17/12* (2013.01); *B23P 6/00* (2013.01); *E21B 19/164* (2013.01); *F16C 43/02* (2013.01); *Y10T 29/49638* (2015.01)

(58) Field of Classification Search
CPC ......... E21B 19/164; B23P 6/00; B25B 13/50; F16C 17/12; F16C 43/02
USPC .......... 384/26, 129, 295, 313, 322; 29/898.01
See application file for complete search history.

(56) References Cited

U.S. PATENT DOCUMENTS

| | | |
|---|---|---|
| D29,522 S | 10/1898 | Cummings |
| 2,305,624 A * | 12/1942 | Lange et al. ................. 81/57.18 |
| D243,406 S | 2/1977 | Mooney et al. |
| 4,080,015 A | 3/1978 | Greby et al. |
| D258,828 S | 4/1981 | Zrobek |
| 4,401,000 A | 8/1983 | Kinzbach |
| D285,109 S | 8/1986 | Jornhagen |
| 4,631,987 A * | 12/1986 | Buck ............................ 81/57.14 |
| D337,336 S | 7/1993 | Losdahl |
| D357,030 S | 4/1995 | McKenna |
| D371,138 S | 6/1996 | Waskiewicz |
| D372,254 S | 7/1996 | Hirayama et al. |
| D379,999 S | 6/1997 | Benson |
| 5,823,074 A * | 10/1998 | Ahlstone ..................... 81/57.34 |
| 6,058,811 A | 5/2000 | Stuart |
| D436,117 S | 1/2001 | Chuang |
| D440,581 S | 4/2001 | Sherman et al. |
| D444,802 S | 7/2001 | Dyson et al. |
| 6,327,938 B1 | 12/2001 | Pietras |
| D455,392 S | 4/2002 | Ordonez |
| D459,366 S | 6/2002 | Heinonen et al. |
| D459,732 S | 7/2002 | Sasaki et al. |

(Continued)

*Primary Examiner* — Marcus Charles
(74) *Attorney, Agent, or Firm* — Merchant & Gould P.C.

(57) ABSTRACT

A bearing is for a tong including a housing and an engagement assembly. The bearing has a monolithic upper bearing element having a substantially planar upper surface and a monolithic lower bearing element having a substantially planar lower surface. The upper and lower bearing elements are configured to mount inside the housing with a substantially same outer horizontal profile as the upper bearing element. The upper bearing element and the lower bearing element define a central open area. The upper bearing element and the lower bearing element have an inner section defining a radial recess opening to the central opening and for receiving the engagement assembly. The upper bearing element and the lower bearing element have outer sections that form a bearing portion radially intermediate the engagement assembly.

14 Claims, 13 Drawing Sheets

(56) References Cited

U.S. PATENT DOCUMENTS

| | | |
|---|---|---|
| D497,977 S | 11/2004 | Engelbrektsson |
| 6,829,967 B1 * | 12/2004 | Kemp ............ 81/57.15 |
| D514,431 S | 2/2006 | Tanaka et al. |
| 7,069,817 B2 | 7/2006 | Wesch, Jr. |
| D597,828 S | 8/2009 | Tanaka et al. |
| D630,191 S | 1/2011 | Chang et al. |
| 7,992,274 B2 * | 8/2011 | Hickman ............ 29/401.1 |
| D661,715 S * | 6/2012 | Hickman ............ D15/143 |
| 8,281,691 B2 * | 10/2012 | Hickman ............ 81/57.15 |
| 2003/0177870 A1 * | 9/2003 | Neves et al. ............ 81/57.2 |
| 2004/0256348 A1 | 12/2004 | Stevens et al. |

* cited by examiner

TONG BEARING

BACKGROUND OF THE INVENTION

1. Field of the Invention

The present invention is directed to a TONG BEARING and in particular, to a machinable TONG BEARING that may be reconditioned for multiple uses and an extended useful life.

2. Description of the Prior Art

Tong systems are utilized in the oil well industry for attaching to and tightening various types of rods and tubing. Such tongs are utilized with a backup system that holds one element while a second element is gripped by the tong and rotated to connect and disconnect the two elements.

A typical tong includes a housing around a gripping portion of the tong, with a gripping portion being driven and rotating relative to the housing. Conventional tongs utilize a series of bearing elements to facilitate rotational movement with less friction and wear. Such rollers, ball bearings or other conventional bearings are subject to the harsh conditions encountered at a well or drilling site. Therefore, such single use conventional bearings are subject to wear and/or failure, requiring frequent replacement. Moreover, in order to ensure smooth and continuous operation, multiple bearings are required at multiple positions spaced apart on both the top and bottom of the tong housing around the gripping assembly. The maintenance and replacement of the large number of bearings is both time consuming and expensive. Moreover, the maintenance required and high rate of failure can cause extended down time for the tong, affecting reliability, causing additional delays and adding to operational costs.

It can be seen then that a new and improved bearing system is needed for tongs. Such a bearing system should eliminate the large number of bearings and small parts currently needed. Moreover, the bearing system should provide for greater reliability and less down time. Such a bearing should be easily removed and interchanged with other bearings. Moreover, the utility of such a bearing is improved if a bearing element can be reconditioned and used again. The present invention addresses these as well as other problems associated with tong bearings.

SUMMARY OF THE INVENTION

The present invention is directed to a tong bearing, and in particular to a renewable tong bearing. The tong includes a housing and drive elements as well as a gripping portion. The bearing includes an upper bearing element and a lower bearing element. Each of the bearing elements includes a generally rounded planar base portion and may include an open end or is closed to form a center opening. An inner annular raised portion is spaced radially outward from the center opening and extends downward from the base for an upper bearing element and upward from the base for a lower bearing element. An outer annular raised portion is adjacent the inner raised annular portion and extends downward from an upper bearing element and upward for a lower bearing element in somewhat tiered configuration. Outer walls form a lip around the outer annular raised portion and engage one another when the upper and lower bearing elements are placed aligned on top of one another. The bearing elements also include a flattened end portion forming a planar wall extending vertically and forming an opening when the upper and lower bearing elements are placed together for receiving drive train elements extending between motors and the gripping portion.

The bearing elements are renewable and are made of a low friction material that is suitable for machining. Therefore, when the bearing elements develop flaws or become worn, the elements may be removed, the surfaces refinished and placed back into the tong for further use. When the satisfactory surfaces are again achieved, the bearing elements may be reused. To make up for lost thickness, shims may be placed in the tong housing and provide sufficient thickness for the bearing.

The large single bearing eliminates the need for a high number of rollers or individual bearing elements and also provides for renewing and reusing the bearing elements. Moreover, the machinable material provides a low friction surface while also providing for refurbishing the elements to extend the useful life of the bearing. The exact configuration and geometry may be varied depending upon the type of tong and its application. Moreover, the upper and lower bearing elements may be mirror images of one another, or for some applications the bearing may need a dedicated upper element and a dedicated lower element. Moreover, depending upon the gripping portion and tong used, the raised portions and/or the outer lip may or may not be required. In some embodiment, lubrication channels are formed in the bearing to facilitate the spread of lubricants.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

BRIEF DESCRIPTION OF THE DRAWINGS

Referring now to the drawings, wherein like reference letters and numeral indicate corresponding structure throughout the several views.

DETAILED DESCRIPTION OF THE PREFERRED EMBODIMENT

Figure 1:
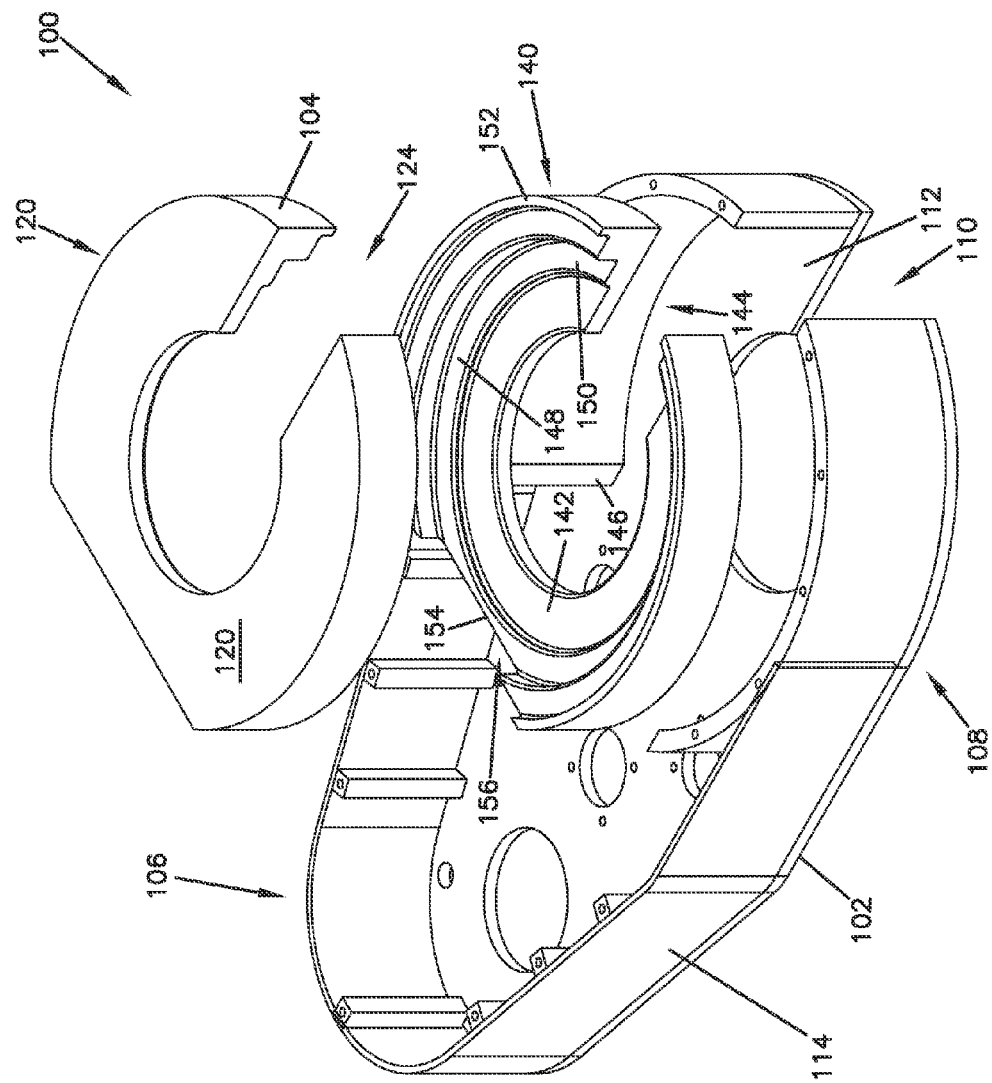
FIG. 1 is an exploded top perspective view of a tong housing with the top of the housing removed with a bearing according to the principles of the present invention.

Referring now to the drawings and in particular to FIGS. 1-4, there is shown a tong 100 according to the principles of the present invention. The tong 100 is shown as an open face tong with an open end 110 but it can be appreciated that the present invention is also applicable for closed face tongs as explained hereinafter. The tong 100 includes a tong housing 102 and a bearing 104. The tong housing 102 is shown with the top cover portion removed for clarity. In addition, the tong 100 includes various drive elements such as may be described in U.S. Pat. No. 8,281,691, entitled TONG ASSEMBLY, which is incorporated herein by reference. By modifying the shape and/or dimensions, the bearing of the present invention can be adapted for use with other types of tongs. The housing 102 includes a drive section 106 and a gripper section 108. The tong housing 102 includes a base 112 and an outer wall 114. The gripper section of the housing 108 also includes a curved wall portion 116 providing for rotation of gripping elements to manipulate tube or rod elements. The curved wall portion 116 also forms an opening to the drive section 106 of the tong housing 102 to permit insertion of drive train elements extending from the drive section 106 to the gripping elements and the bearing section 108. This arrangement is also shown for a closed head tong in FIG. 16, described herein below.

Figure 2:
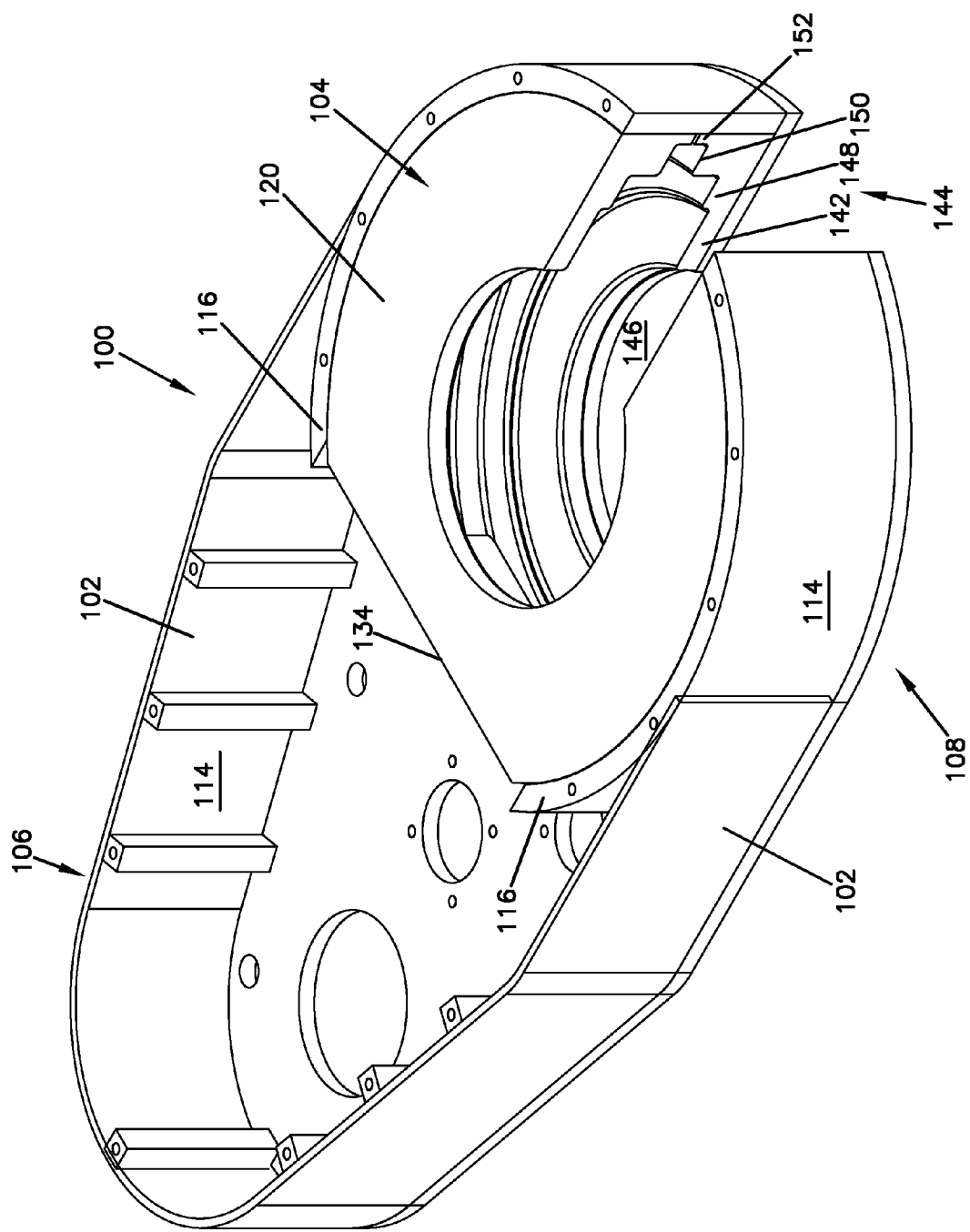
FIG. 2 is a top perspective view of the bearing and the tong housing shown in FIG. 1.
Figure 3:
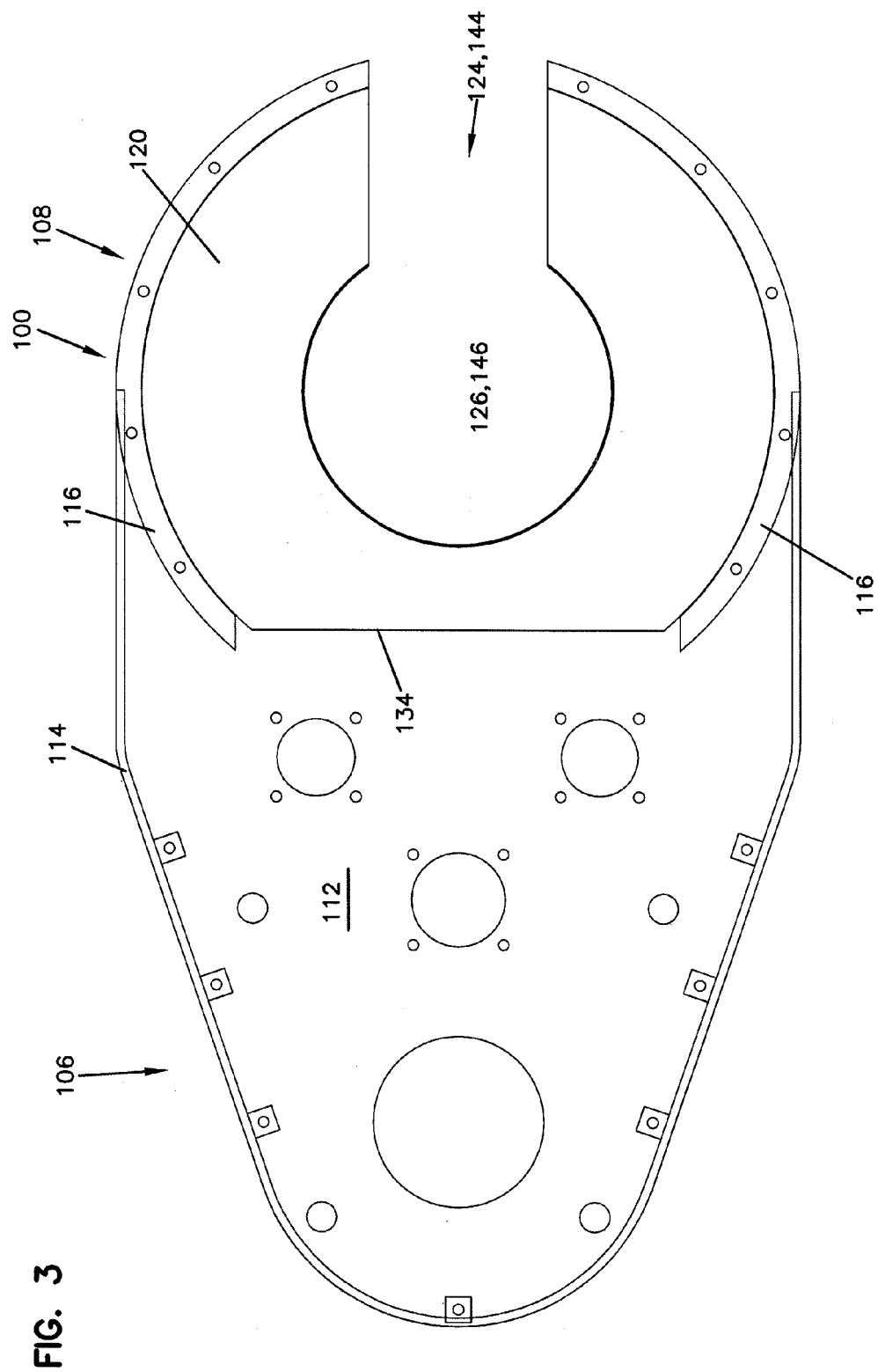
FIG. 3 is a top plan view of the bearing and the tong housing shown in FIG. 1.
Figure 4:
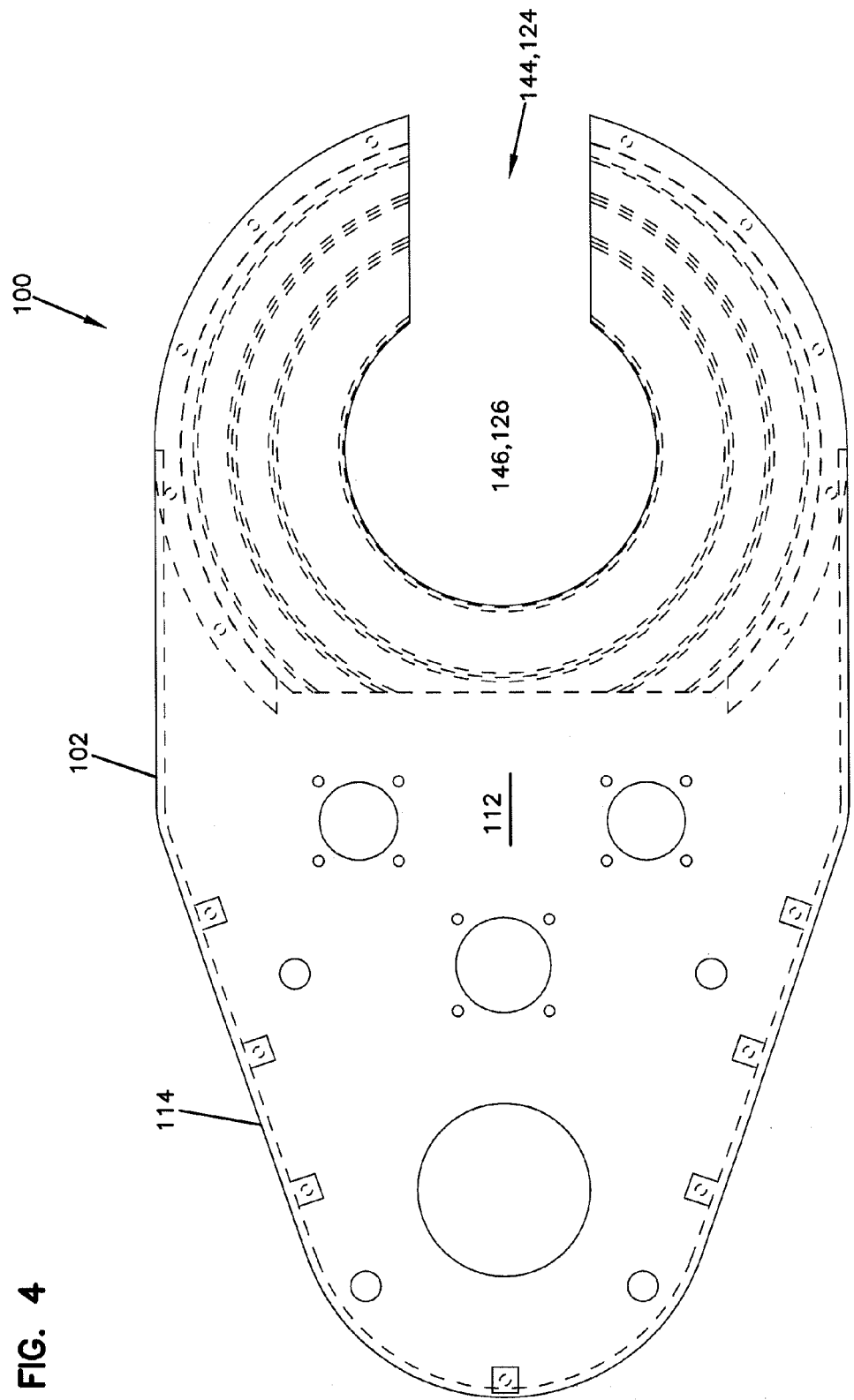
FIG. 4 is a bottom plan of the bearing and housing shown in FIG. 2.
Figure 5:
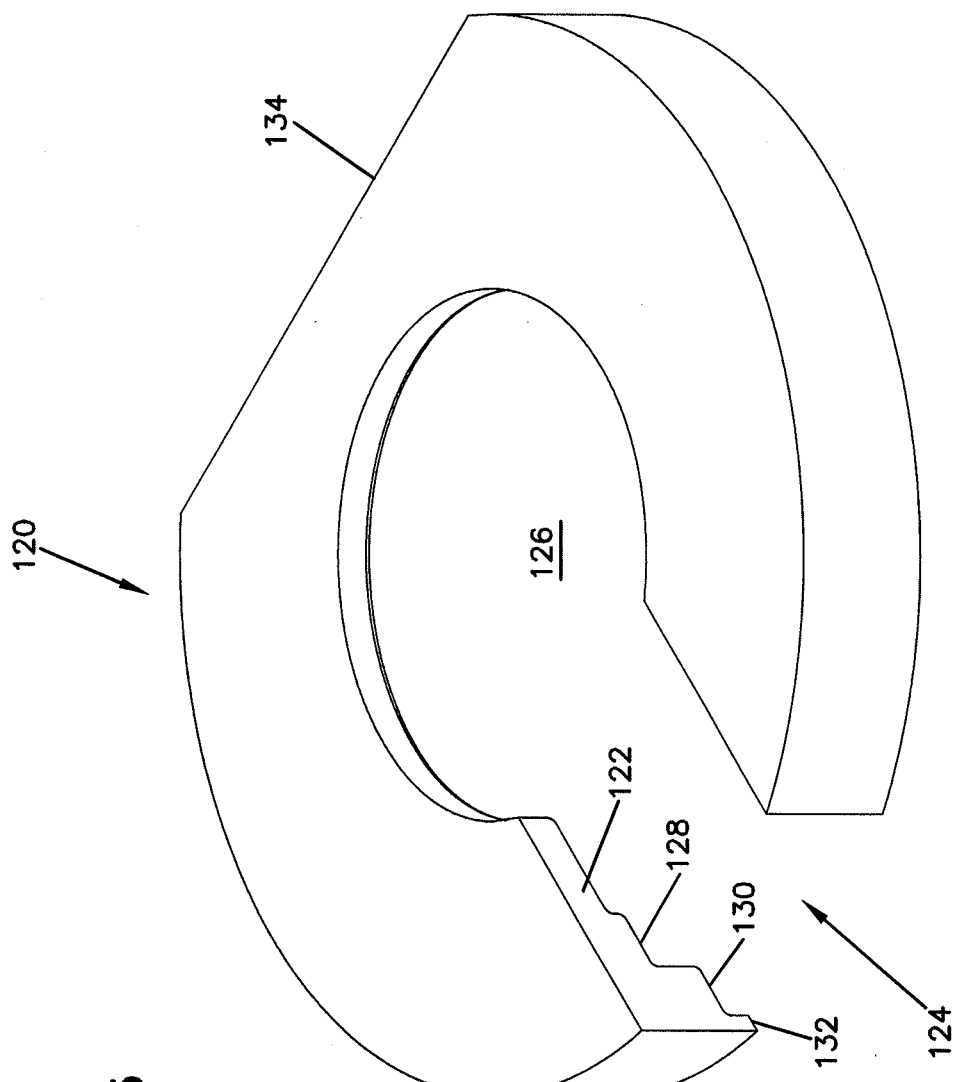
FIG. 5 is a top perspective view of an upper bearing element for the bearing shown in FIG. 1.

As shown in FIGS. 1 and 2, the bearing 104 includes an upper bearing element 120 and a lower bearing element 140. The bearing elements 120 and 140 are configured for engaging one another at their periphery along an intermediate horizontal plane to form the bearing 104. In the embodiment shown, the upper bearing element 120 is identical to the lower bearing element 140. Therefore, the elements 120 and 140 may be interchanged and a supply of a single type of replacement bearing elements may be used without requiring a dedicated top or bottom element. However, in other embodiments the upper bearing element may have a different configuration than the lower bearing element.

Referring to FIGS. 5-9, the upper bearing element 120 is shown. It can be appreciated however that upper bearing element 120 is identical to the lower bearing element 140 in the embodiment shown and the upper bearing element 120 may simply be flipped over to provide a lower bearing element 140. Although only the upper bearing element 120 will be described, other than orientation, the description applies equally to the lower bearing element 140. The bearing element 120 includes a base 122 and defines an open end 124. The open end 124 leads to a center open portion 126. The center opening 126 is configured for receiving gripping elements that engage rods, tubing and other elements to be gripped and rotated. Spaced radially outward from the inner edge of the base 122 of the center open portion is an inner annular raised portion 128. The raised portion 128 extends downward for an upper bearing element 120 and an inner annular raised portion 148 extends upward for a lower bearing element 140. An outer annular raised portion 130 is adjacent and radially outward from the inner annular raised portion 128. The outer annular raised portion 130 extends downward further than the inner annular raised portion 128 for an upper bearing element while an outer annular raised portion 150 extends upward for a lower bearing element 140. An outer wall 132 forms a lip that extends yet further downward than the outer annular raised portion 130 on the upper bearing element 120. An outer wall portion 152 for a lower bearing element 140 extends upward and is configured to engage the outer wall portion 132 of the upper bearing element 120. The outer wall portions 132 and 152 therefore form a vertically continuous curved wall when the bearing is assembled. The base 122, the inner annular raised portion 128, the outer annular raised portion 130 and the outer wall 132 form a terraced surface on the underside of the upper bearing element 120. The bearing elements 120 and 140 are generally annular but include a flattened end portion 134. The end portion 134 forms a planar vertical surface with an opening 136 to provide access for tong drive train elements that insert through the opening 136. This arrangement is seen more clearly in FIG. 16

In a configuration mirroring the upper bearing element 120, the lower bearing element 140 also includes a bearing base 142, an open end 144, forming an open center 146. The lower bearing element 140 includes an inner annular raised portion 148 situated next to an outer annular raised portion 150 and an outer wall 152. The lower bearing element includes a flattened end portion 154 and a drive train access opening 156. Therefore, the base 142, the inner annular raised portion 148, the outer annular raised portion 150 and the outer wall 152 form a terraced surface on the top of the lower bearing element 140.

Figure 10:
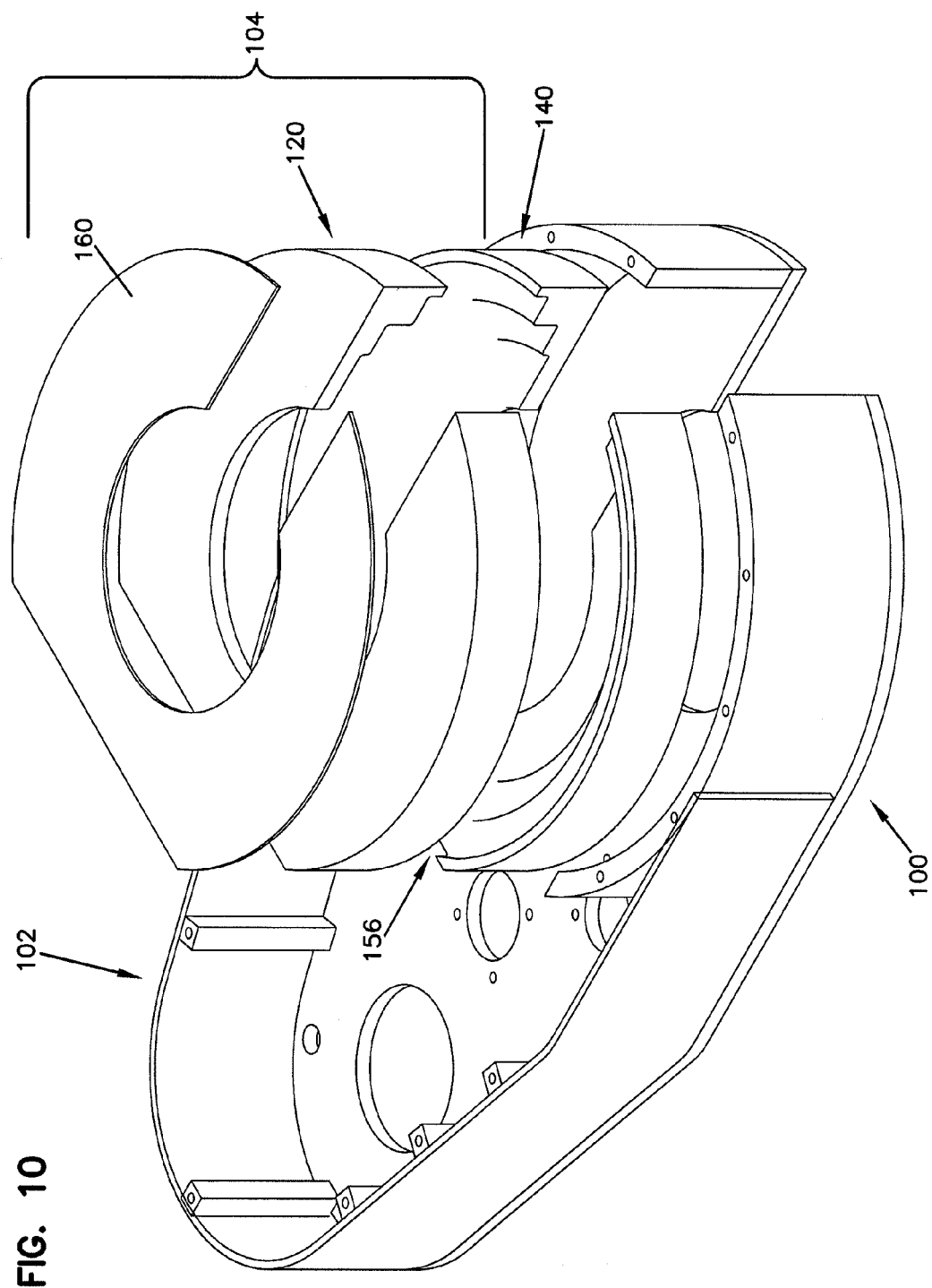
FIG. 10 is an exploded view of the tong housing and bearing shown in FIG. 1 with shims added.
Figure 11:
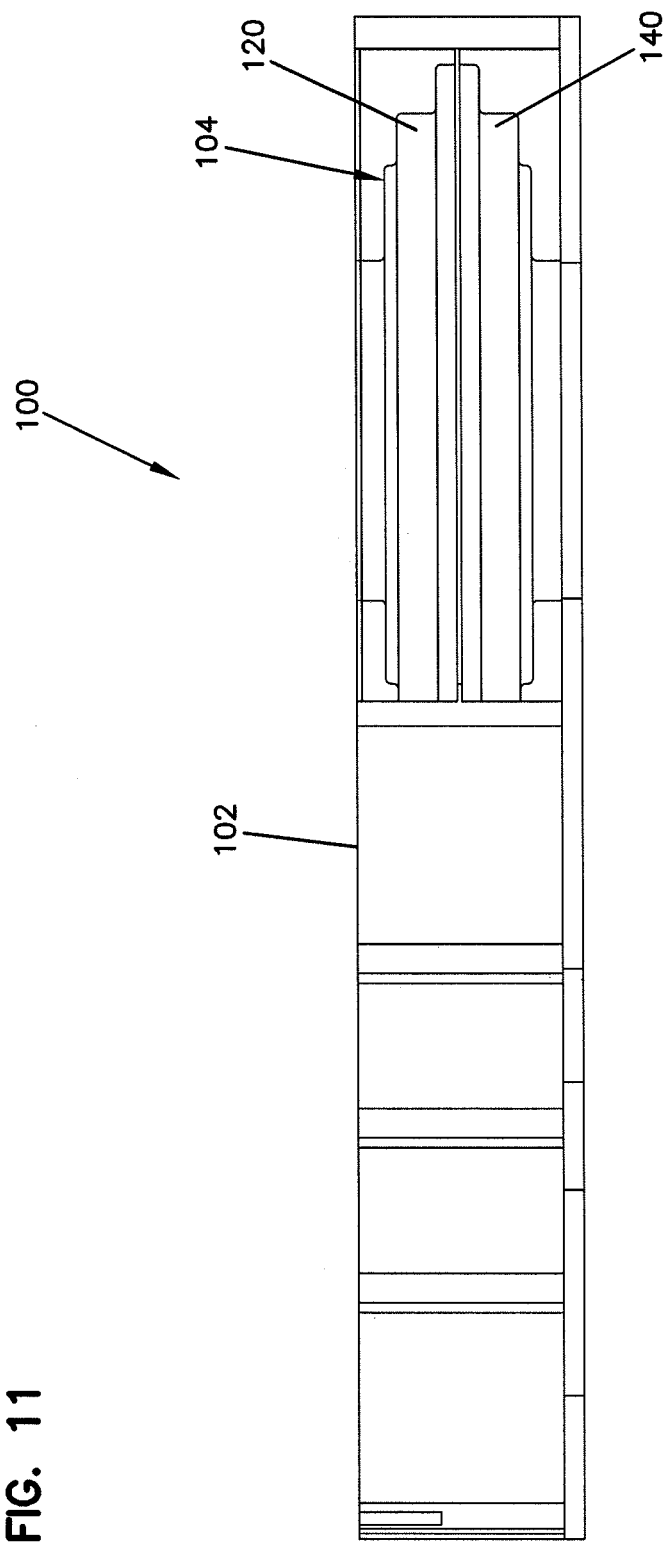
FIG. 11 is a side sectional view of the tong housing and bearing shown in FIG. 10.
Figure 12:
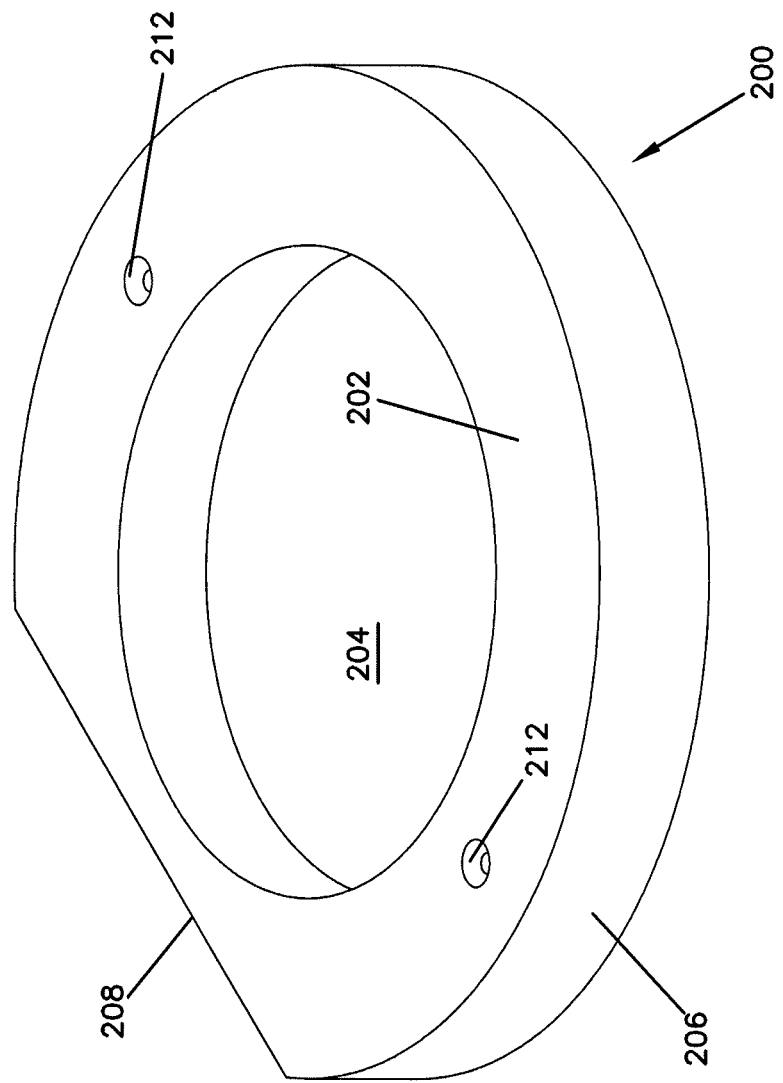
FIG. 12 is a perspective view of a second embodiment of a bearing element according to the principles of the present invention.
Figure 13:
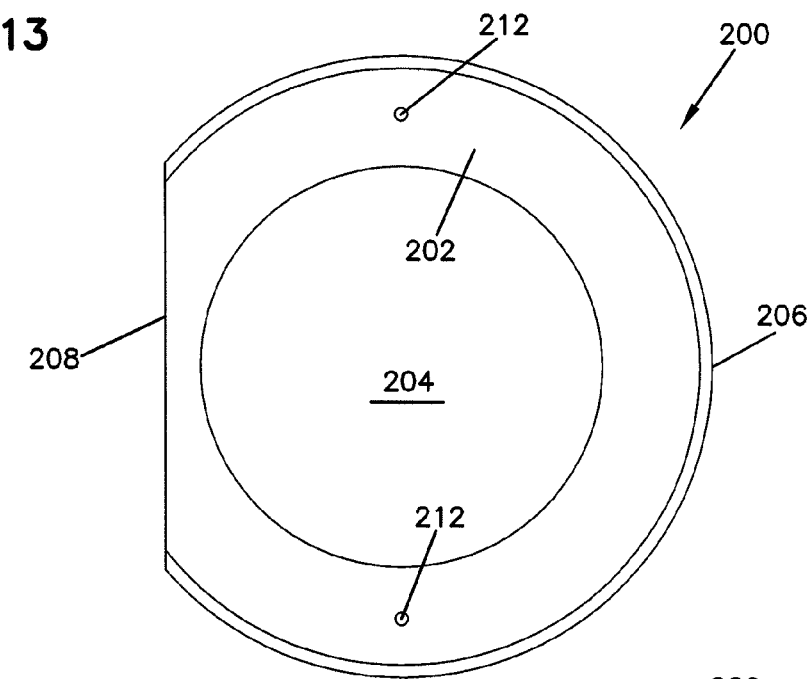
FIG. 13 is a bottom plan view of the bearing element shown in FIG. 12.
Figure 14:
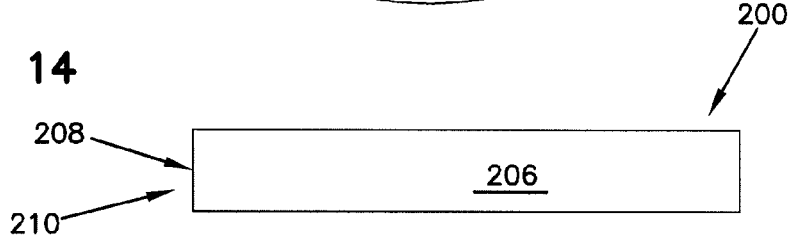
FIG. 14 is a side elevational view of the bearing element shown in FIG. 12.
Figure 15:
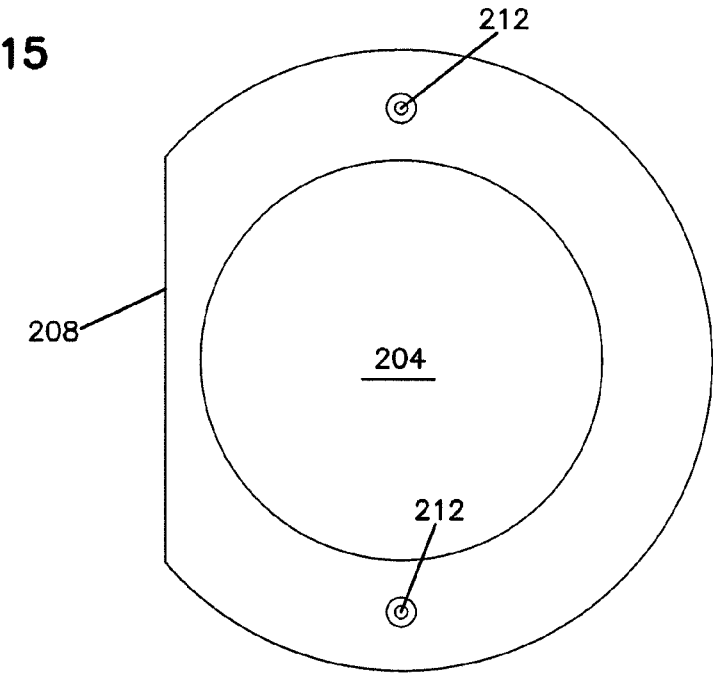
FIG. 15 is a top plan view of the bearing element shown in FIG. 12.

The bearing 104 operates in a very harsh environment and is subject to wear. However, the bearing elements 120 and 140 are Phenolic type bearings made of a durable, yet low friction machinable material. The bearing 104 may be made from a laminated plastic material that may include dry lubrication compounds. Suitable Phenolic bearing materials are available from ScanPac Mfg., Inc. of Menomonee Falls, Wis. Therefore, the bearing 104 may be removed and the elements 120 and 140 machined if necessary to maintain smooth bearing surfaces. If too much thickness is lost, one or more shims 160 may be inserted against the base 122 and/or the base 142, as shown in FIGS. 10 and 11. The shims 160 are also made of a durable low friction material and maintain an appropriate height for the bearing 104. Use of shims extends the life of the bearing and provides for reuse of bearing elements rather than a single use and disposal of the bearing elements.

Figure 6A:
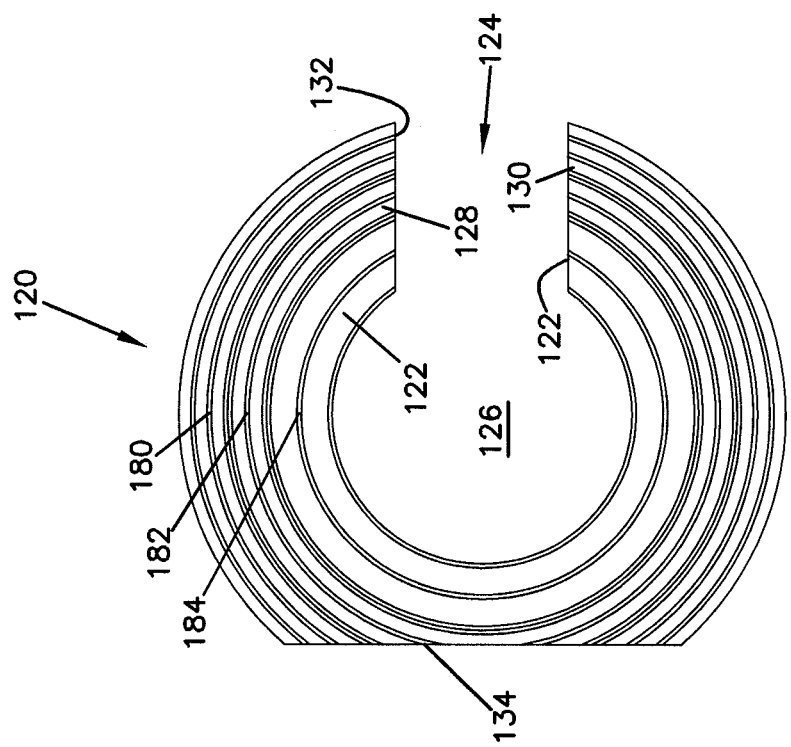
FIG. 6A is a bottom plan view of an alternate embodiment of the upper bearing element.
Figure 6:
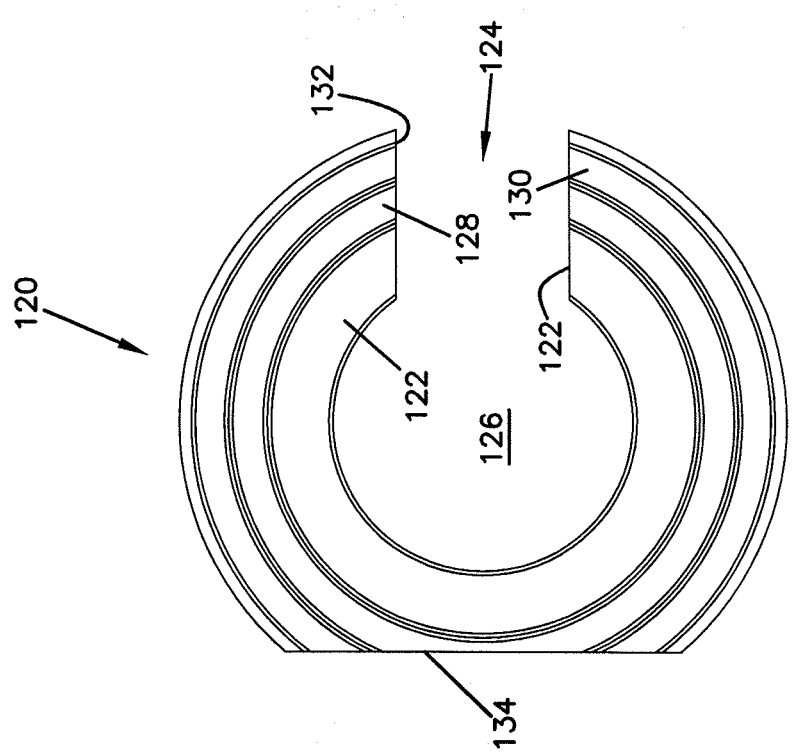
FIG. 6 is a bottom plan view of the upper bearing element shown in FIG. 5.
Figure 8:
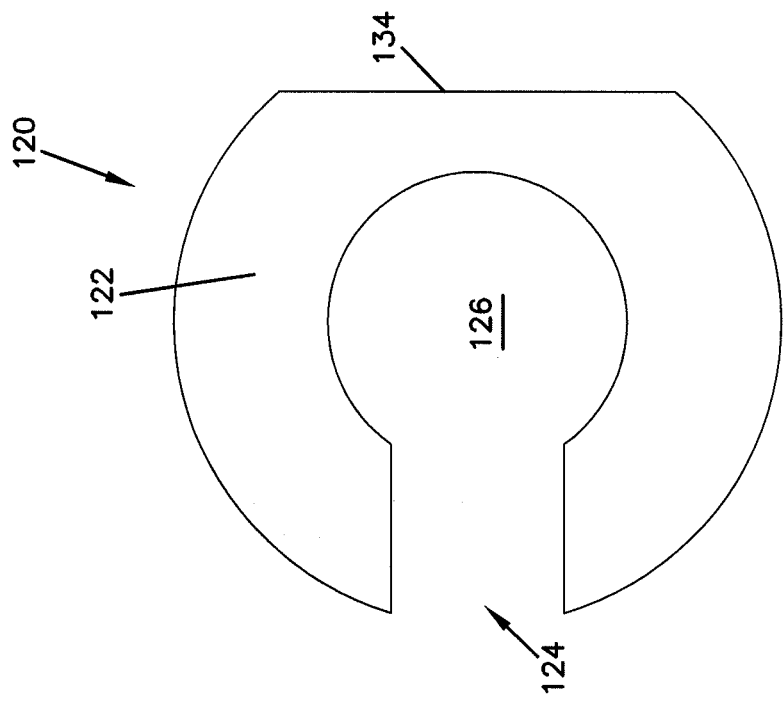
FIG. 8 is a top plan view of the upper bearing element shown in FIG. 5.
Figure 7:
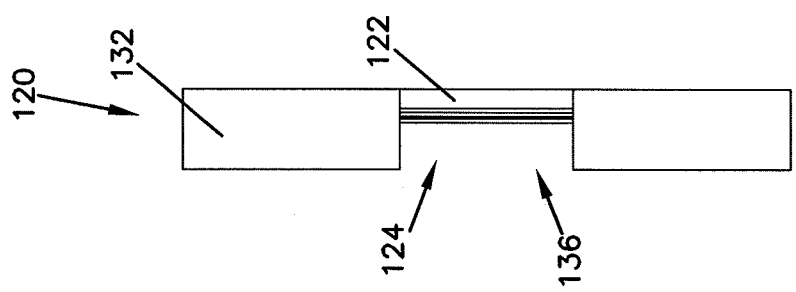
FIG. 7 is a side elevational view of the upper bearing element shown in FIG. 5.
Figure 9:
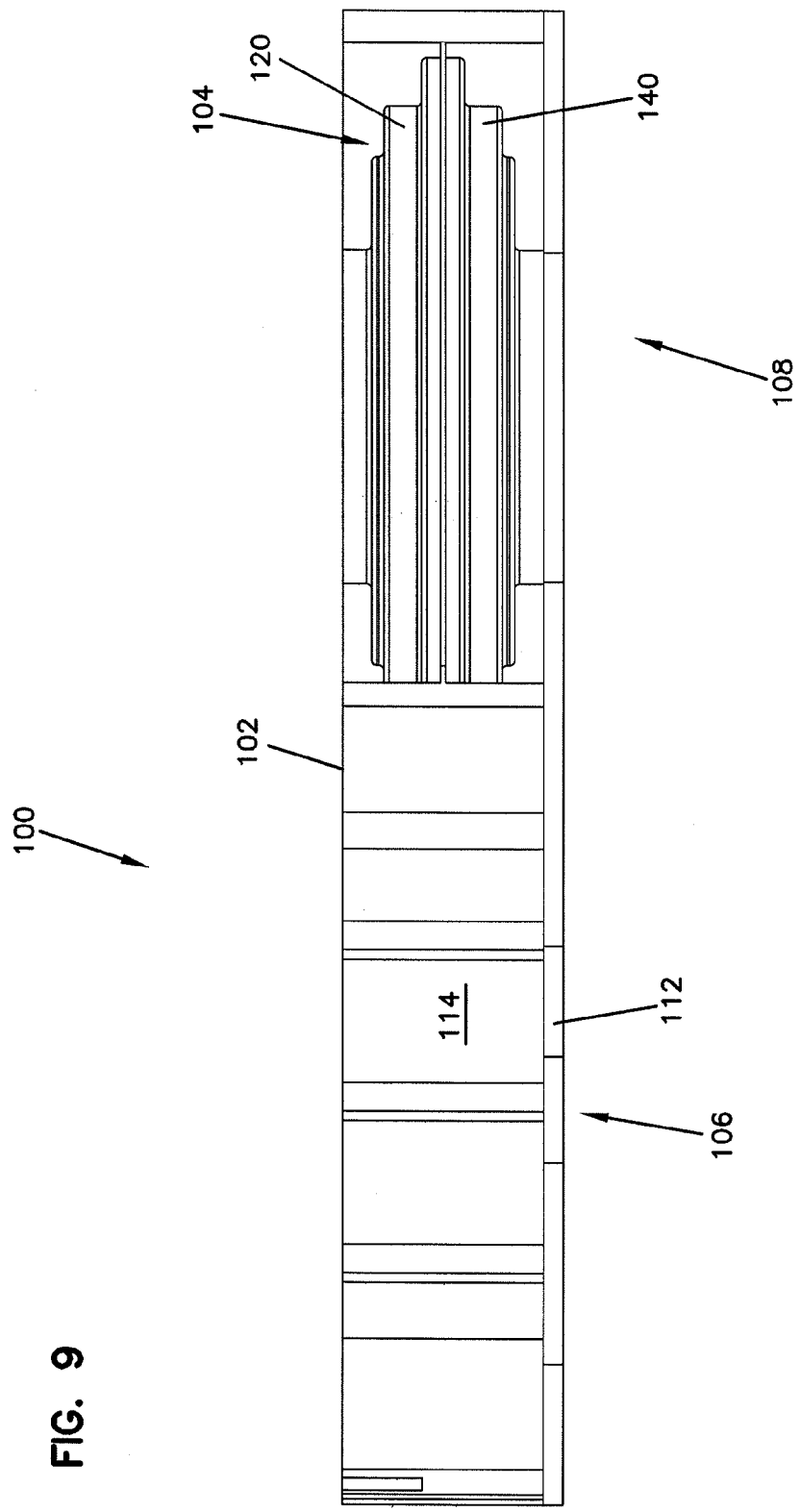
FIG. 9 is a side sectional view through the bearing and tong housing shown in FIG. 1.

For some applications, further lubrication may be utilized. As shown in FIG. 6A, the bearing element 120 may be configured to include one or more lubrication channels 180, 182 and 184. In the configuration shown, a lubrication channel 180 is formed in the outer annular raised portion 130, a lubrication channel 182 is formed in the inner annular raised portion 128 and a lubrication channel 184 is formed in the base 122. It can be appreciated that fewer and more channels may be utilized for different bearings and for some applications. Moreover, the lubrication channels may be located and oriented in different configurations to facilitate distribution of lubricants to various places requiring additional lubrication.

Figure 16:
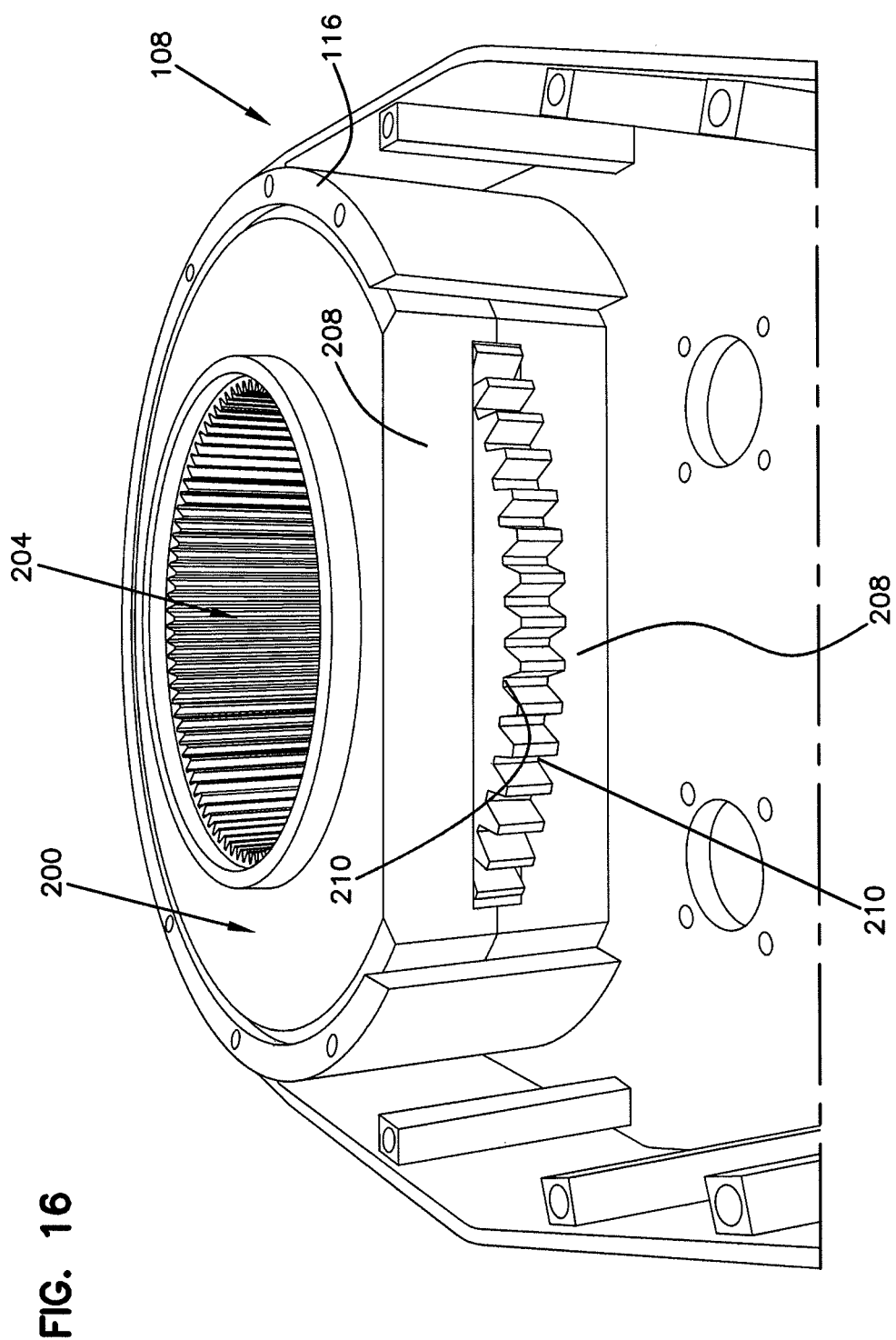
FIG. 16 is a perspective view of the bearing element shown in FIG. 12 and a portion of the housing.

As shown in FIGS. 12-15, a second embodiment is shown of a bearing 200 suitable for use with a closed face tong. The bearing element 200, shown as an upper bearing element in FIG. 12, may be reversed for use as a lower bearing element. However, in some applications the upper and lower bearing elements may have a different configuration. The closed face bearing element 200 includes a base 202 forming a center opening 204. The closed face bearing element 200 includes an outer wall 206 that extends from both ends of a flattened vertically planar portion 208. The flattened portion 208 provides an opening 210 to receive a gear 118, as shown in FIG. 16. The closed face bearing 200 also includes alignment holes 212 through the base 202. As with the open face tong bearing 104, the closed face tong bearing 200 is configured so that the edges of the outer wall 206 meet and form a continuous curving outer wall portion when the upper bearing element and the lower bearing element are set together.

It may also be appreciated that a machinable bearing may take other similar configurations for use with multiple types of tongs used throughout the industry. Moreover, the shims may also be configured differently to accommodate for the different sizes and applications for the tong bearings.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A bearing for a tong, the tong including a housing and an engagement assembly, the bearing comprising:
   a monolithic upper bearing element having a substantially planar upper surface;
   a monolithic lower bearing element having a substantially planar lower surface, the upper and lower bearing elements being configured to mount inside the housing with a substantially same outer horizontal profile as the upper bearing element;
   the upper bearing element and the lower bearing element defining a central open area;
   the upper bearing element and the lower bearing element having an inner section, wherein when assembled, the inner sections of the upper bearing element and the lower bearing element define a radial recess opening to the central opening and configured for receiving the engagement assembly;
   the upper bearing element and the lower bearing element having an outer section wherein when assembled, the outer sections of the upper bearing element and the lower bearing element form a bearing portion radially intermediate the engagement assembly.

2. A bearing according to claim 1, wherein the bearing comprises a machinable material.

3. A bearing according to claim 1, wherein the bearing comprises a phenolic bearing.

4. A bearing according to claim 1, further comprising a shim intermediate the bearing and the tong housing.

5. A bearing according to claim 1; wherein the upper bearing element is a mirror image of the lower bearing element.

6. A bearing according to claim 4, wherein the shim has a profile matching the profile of the upper bearing element or the lower bearing element.

7. A bearing according to claim 1; wherein at least one of the upper bearing element or lower bearing element comprises a lubrication channel.

8. A method for using a bearing for a tong, the bearing including: a monolithic upper bearing element having a substantially planar upper surface; a monolithic lower bearing element having a substantially planar lower surface, the upper and lower bearing elements being configured to mount inside the housing with a substantially same outer horizontal profile as the upper bearing element;
   the upper bearing element and the lower bearing element defining a central open area, and the upper bearing element and the lower bearing element having an inner section, wherein when assembled, the inner sections of the upper bearing element and the lower bearing element define a radial recess opening to the central opening and configured for receiving the engagement assembly; the upper bearing element and the lower bearing element having an outer section wherein when assembled, the outer sections of the upper bearing element and the lower bearing element form a bearing portion radially intermediate the engagement assembly; the method comprising:
   removing the bearing elements reconditioning surfaces of the bearing elements;
   replacing the bearing in the tong;
   adding one or more shims intermediate the tong and the bearing.

9. A method for using a bearing according to claim 8, wherein the one or more shims have a periphery matching the periphery of the bearing elements.

10. A method for using a bearing according to claim 8, wherein the bearing comprises a machinable material.

11. A method for using a bearing according to claim 8, wherein the bearing comprises a phenolic bearing.

12. A method of using a bearing according to claim 8, comprising placing at least one shim intermediate the planar surface of the bearing and the tong.

13. A method of using a bearing according to claim 8, wherein the upper bearing element is a mirror image of the lower bearing element.

14. A method of using a bearing according to claim 8, further comprising forming a lubrication channel in the bearing.

* * * * *